United States Patent Office 3,115,422
Patented Dec. 24, 1963

3,115,422
TREATMENT OF METALS
Robert F. Thomson, Grosse Pointe Woods, Mich., assignor to General Motors Corporation, Detroit, Mich., a corporation of Delaware
No Drawing. Filed June 6, 1960, Ser. No. 33,922
4 Claims. (Cl. 117—132)

This invention relates to treatment of metals to increase the fatigue life thereof and more particularly to a method of forming corrosion-resistant coatings on metal articles.

The durability of ferrous metal parts is frequently reduced due to use of the part in a corrosive atmosphere. Accordingly, improved durability of the part can be attained if the part is suitably protected from the corrosive environment. The fatigue life of metal parts which are subjected to various dynamic stresses is particularly affected by a corrosive environment, wherein corrosion of the parts contributes to an early failure. An improvement in corrosion fatigue, accordingly, increases the overall fatigue life of the part. Ferrous metal parts, such as torsion bars, drive shafts, rolling contact bearings and the like frequently are subjected to a corrosive environment which reduces the fatigue life of the part.

Rolling contact bearing members, for example, which are operated in contact with diester lubricants are particularly affected by corrosion fatigue. A rolling contact bearing operated for only a short time in contact with a diester lubricant frequently exhibits an etched and superficially pitted surface which renders the bearing unsuitable for further service. Although a bearing assembly containing the etched or pitted members may have a relatively long period of useful life left, except for these surface effects, the bearing assembly must be replaced due to vibrational problems which result during use thereof. By reducing the corrosive action of the diester lubricant on the bearing member, the fatigue life of the bearing, in general, is concurrently increased.

It is a primary object of my invention to provide a thin, extremely adherent, corrosion-resistant coating on the surface of metal articles, particularly dynamically stressed metal articles, which are subjected to corrosion fatigue.

Other objects of my invention are to provide an article having a corrosion-resistant coating thereon and to provide a method of reducing corrosion fatigue of metal parts. Other objects, features and advantages of my invention will become more apparent from the following description of preferred embodiments thereof hereinafter set forth.

The invention comprehends treating the surface of a metal part prior to the intended use thereof with a suitable organo compound so as to form a corrosion-resistant coating on the metal part. The coating is applied to the surface of the metal part by placing the surface of the part in contact with the organo compound, which is at an elevated temperature, for a sufficient duration to deposit an extremely adherent, thin layer of a decomposition product of the organo compound on the surface of the metal part.

I have found that the protective coating of my invention can be formed by treating the metal part in accordance with the invention using a lubricant which fulfills the requirements set forth in "Military Specification for Lubricating Oil, Gas Turbine Aircraft," No. Mil-L-7808 (USAF).

Although a number of diester lubricants fulfilling the requirements of Military Specification No. Mil-L-7808 have been used to effectively produce the protective coating of my invention, especially satisfactory results have been obtained when using a diester lubricant which is basically a derivative of sebacic acid.

Other organo compounds which have also been found to be satisfactory in forming coatings in accordance with my invention are those such as tetra-2-ethyl hexyl silicate and also the chlorinated silicone lubricant commercially available under the trade name "Versilube F-50" available from General Electric Company, Schenectady, New York. However, best results have been obtained using the diester lubricants. In some instances such organo lubricating compounds containing carbon chains in excess of about eight carbon atoms to as high as about forty carbon atoms and even higher may be used in the invention.

Comparative tests on rolling contact bearings have indicated that a variety of lubricants fulfilling the requirements of the aforementioned Military Specification No. Mil-L-7808, particularly diester lubricants, can be used to form the adherent protective coating in accordance with my invention. A typical rolling contact bearing, such as one made of a metal containing 0.95% to 1.1% carbon, 0.25% to 0.45% manganese, 1.3% to 1.6% chromium, 0.25% maximum silicon and the balance iron has been tested by extended running in the presence of a diester lubricant containing 1% phenothiazine, 2% to 3% tricresylphosphate and the balance di-2-ethyl hexyl sebacate. This mixture more rapidly attacks the metal, accelerating the testing.

The following Table I lists some of the lubricants which were used to pretreat bearing balls which were subsequently run in the presence of the above-mentioned test lubricant under identical conditions:

Table I

| Test Group | Precoating Oil 20 hrs. at 500° F. | Relative Fatigue Life | |
|---|---|---|---|
| | | Minimum | 50% Failure |
| 1 | Not treated | 1.00 | 1.00 |
| 2 | 1% phenothiazine, 2% to 3% tricresylphosphate, balance di-2-ethyl hexyl sebacate | 8.30 | 5.02 |
| 3 | Di-2-ethyl hexyl sebacate | 7.47 | 3.46 |
| 4 | Polypropylene glycol, 1% phenyl and naphthalamine, viscosity 6.8 cs. at 210° F., 36.5 cs. at 100° F. | 2.98 | 1.83 |
| 5 | Di-2-ethyl hexyl azelate | 4.78 | 3.26 |
| 6 | Dipropylene glycol, dipelargonate | 4.48 | 3.61 |
| 7 | Tetra-2-ethyl hexyl silicate | 6.57 | 3.33 |
| 8 | Polybutylene average molecular weight, 420, viscosity 111.4 cs. at 100° F., 12 cs. at 210° F. | 2.54 | 2.37 |

As indicated above, the fatigue life of a rolling contact bearing member treated in accordance with my invention is materially increased by generally any of the lubricants of the aforementioned Military Specification No. Mil-L-7808 type. Although an overall increase in fatigue life is an important factor, also of importance is the even greater increase afforded to minimum fatigue life.

In making the comparative tests indicated in Table I, each test group comprised 10 test bearing members. The minimum fatigue life referred to in Table I is a predicted minimum life any bearing member, of a group having an infinite number of members, would have, as predicted from the application of Weibull distribution statistical techniques to observed test results of the given group. The 50% failure fatigue life compared in Tables I and II is a predicted duration that at least 50% of the members of a given test group would run if the group had an infinite number of members. This prediction is also made from the application of Weibull distribution statistical techniques, referred to above, to observed test results. These statistical techniques have previously been described by Johnson ("The Median Ranks of Sample Values in Their Population With an Application to Certain Fatigue Studies," Leonard G. Johnson, Industrial Mathematics, vol. 2, 1951; "Fatigue Tests Proved by Three Statistical Checks," Leonard G. Johnson, SAE Journal, March 1958, pp. 72–73; "Statistical Estimation of the Minimum Life in Fatigue," Leonard G. Johnson, G.M. Research Laboratories Technical Memorandum 34–948, March 10, 1958; Statistics of Extremes, E. J. Gumbel, Columbia University Press, 1958, p. 302).

I have found that the coating formed in accordance with my invention not only increases fatigue life of bearing balls when run in a diester lubricant, but also when run in a conventional mineral oil type lubricant. This is believed to be due to the decrease in corrosion fatigue afforded by the invention. The following Table II indicates the vast improvement in fatigue life which is possible when running bearing balls having my coating in both diester and mineral oil type lubricants:

*Table II*

| Test Group | Precoating Oil 30 hrs. at 400° F. | Test Oil | Relative Fatigue Life |
|---|---|---|---|
| 1 | Not Treated | 1% phenothiazine, 2% to 3% tricresylphosphate, balance di-2-ethyl hexyl sebacate. | 1.00 |
| 2 | 1% phenothiazine, 2% to 3% tricresylphosphate, balance di-2-ethyl hexyl sebacate. | Same | 25.11 |
| 3 | Same | Paraffin, napthaline-mineral oil. | 15.14 |

The temperature at which the protective coating is formed on the bearing element is limited in its upper extreme by the temperature which would deleteriously affect the metal composing the bearing element and the temperature at which the coating lubricant is adversely affected. However, a sufficiently high temperature must be used to obtain the coating within a reasonable amount of time.

It is well known that temperatures in excess of approximately 500° F. may tend to objectionably soften the hereinafter described bearing metals and, accordingly, temperatures and durations of treatment at such temperatures should be used with discretion. Examination of the comparative test results listed in Tables I and II indicates that the fatigue life of a bearing coated in accordance with my invention is not as greatly improved when heated at 500° F. as when the coating is formed at a temperature of approximately 400° F. The optimum temperature, of course, will depend upon the particular lubricant employed as well as the rolling contact bearing metal being treated. It is possible that the greater improvement in fatigue life of parts coated at 400° F. over those coated at 500° F. may be due to a softening of the hardened bearing metal of the part. However, the softening that occurs during treatment at 500° F. is still not so great a disadvantage as to overcome the material advancement in fatigue life offered by my invention. In general, it has been found that very little improvement is evidenced when the bearing element is treated for only about 30 hours at a temperature below 300° F. On the other hand, immersion in a diester lubricant which is at a temperature of about 350° F. for about 100 hours provides a materially beneficial increase in corrosion resistance and overall useful life of the bearing element.

In general, the treatment can be accomplished using any temperature which is sufficient to deposit the protective coating on the surface of the part treated but which is below that temperature which would adversely affect the characteristics of the metal of which the part is composed. Inherently, of course, if the temperature is a suitable temperature for depositing the coating, it is below that temperature which would decompose the lubricant in such a manner as to inhibit deposition of the coating. Accordingly, by the term "an elevated temperature" I mean to encompasss only those temperatures sufficient to deposit the coating on the metal but which would not deleteriously affect either the metal of which the bearing is composed or the coating properties of the lubricant.

The duration of contact between the surface of the bearing member and the lubricant required to deposit a sufficient thickness of the protective coating is variable. Principally, the length of time required to deposit a suitable thickness is dependent upon the temperature at which the lubricant is maintained during the treatment period. For example, 100 hours' immersion in a diester lubricant which is maintained at a temperature of 350° F. has provided a material increase in corrosion resistance of a bearing member. On the other hand, an immersion for only 20 hours in a diester lubricant maintained at a temperature of approximately 400° F. was sufficient to deposit a coating of the magnitude of approximately 0.0001 inch in thickness. Immersion in a diester lubricant maintained at a temperature of less than 300° F. for about 30 hours did not provide any visible coating. However, increases in fatigue life may be obtained even though the coating is of insufficient thickness to be visible to the unaided eye. It appears that satisfactory results can be obtained in relatively short duration of immersion of about 20 hours to 30 hours if the temperature of the lubricant is maintained between approximately 350° F. and 500° F. Longer durations of time are required to deposit sufficient coating thicknesses when the lubricant is maintained at a lower temperature.

The thickness of the coating can vary appreciably and is not necessarily of any substantial thickness, but I have obtained effective results when the protective coating has a thickness approximately 0.00005 inch. However, extremely thin but effective coatings as well as coatings up to approximately 0.0001 inch are useful.

My invention is particularly satisfactory when used to coat members of rolling contact bearings, such as ball bearings, roller bearings and spherical bearings. Metals used for forming these bearings generally are those containing over 95% iron, although in some instances, particularly for higher temperature applications, higher alloy steels also can be used. The compositions of some typical metals used in rolling contact bearings are listed in the following Table III in terms of proportions by weight:

*Table III*

| | Example 1 | Example 2 | Example 3 | Example 4 |
|---|---|---|---|---|
| Carbon | 0.5–1.1 | 0.18–0.23 | 0.95–1.20 | 0.78–0.84 |
| Manganese | 0.25–0.45 | 0.70–9.90 | | 0.15–0.40 |
| Chromium | 0.9–1.15 | 0.55–0.75 | 16.0–18.0 | 3.50–4.0 |
| Molybdenum | | 0.08–0.15 | [1] 0.75 | 8.20–9.40 |
| Nickel | | 0.30–0.60 | | |
| Silicon | [1] 0.25 | [1] 0.25 | | 0.25–0.45 |
| Tungsten | | | | 1.30–2.0 |
| Vanadium | | | | 1.00–1.30 |
| Iron | Balance | Balance | Balance | Balance |

[1] Maximum.

My invention has been primarily described in connection with improving corrosion fatigue of a rolling contact bearing, emphasizing the peculiar adherence and wear resistance of the protective coating formed. However, as previously indicated, the invention also encompasses use of such an adherent coating on other dynamically stressed metal parts. The invention, therefore, comprehends use of the corrosion-resistant coating on torsion bars, drive shafts, axle shafts and the like, any part which may be exposed to a corrosive environment.

In addition to the metals disclosed in Table III, the coating may also be attained using other metals. The following alloy can be used for torsion bars, axle shafts or the like: carbon .55% to .65%, manganese .75% to 1.00%, phosphorus and sulfur .04% maximum, silicon .20% to .35%, chromium .70% to .90% and iron balance, all percentages by weight. A greater latitude in treatment, temperatures and times is afforded when applying a coating to a metal, such as the last-mentioned, as normal tempering temperatures thereof are higher than those of the bearing metals referred to in Table III. In such instance it may be preferred to treat the metal at a higher temperature than 500° F. and for a longer duration than 30 hours.

Although this invention has been described in connection with certain specific examples thereof, no limitation is intended thereby except as defined in the appended claims.

I claim:

1. A method of improving the corrosion resistance and fatigue life of rolling contact steel bearing elements, which comprises pretreating the wear surfaces of said elements before assembly and use of said elements by applying an organic diester compound to said surfaces of said elements while disassembled at a temperature above 350° F. and for a time sufficient to deposit a coating having a thickness not greater than 0.0001 inch, said compound being the reaction product of a dicarboxylic acid having about 8 to 10 carbon atoms and an aliphatic alcohol having approximately 8 carbon atoms.

2. A method of pretreating the wear surfaces of metal bearing elements before use of said elements, said method comprising the steps of providing a bath of an organic diester reaction product of a dicarboxylic acid and an aliphatic alcohol, said acid having about 8 to 10 carbon atoms and said alcohol having approximately 8 carbon atoms, maintaining said bath at a temperature in excess of 350° F. but below the annealing temperature of said metal bearing elements, immersing said elements in said bath for a time sufficient to deposit a thin but adherent protective coating on the surfaces of said elements and subsequently removing said elements from said bath.

3. A method of improving the corrosion resistance and fatigue life of rolling contact steel bearing elements, which comprises pretreating the wear surfaces of said elements prior to the assembly and use of said elements in operation by applying at a temperature above 350° F. at least one compound selected from the group consisting of di-2-ethyl hexyl sebacate, polypropylene glycol, di-2-ethyl hexyl azelate, dipropylene glycol, dipelargonate, tetra-2-ethyl hexyl silicate and polybutylene to said surfaces of said elements which are subject to wear while said elements are in a disassembled state, and maintaining said compound in contact with said surfaces for a time sufficient to form a coating on said surfaces having a thickness not greater than about 0.0001 inch, said coating being formed by the thermal decomposition of said compound at said surfaces.

4. A method of pretreating the wear surfaces of metal bearing elements before assembly and use of said elements, said method comprising the steps of providing a bath containing at least one compound selected from the group consisting of di-2-ethyl hexyl sebacate, polypropylene glycol, di-2-ethyl hexyl azelate, dipropylene glycol, dipelargonate, tetra-2-ethyl hexyl silicate and polybutylene, maintaining said bath at a temperature in excess of 350° F. but below the annealing temperature of said elements, immersing said elements in said bath for a time sufficient to deposit a thin but adherent protective coating on the surfaces of said elements, and subsequently removing said elements from said bath.

References Cited in the file of this patent

UNITED STATES PATENTS

| | | |
|---|---|---|
| 1,396,032 | Forcellon | Nov. 8, 1921 |
| 2,339,200 | Sowa | Jan. 11, 1944 |
| 2,450,221 | Ashburn | Sept. 28, 1948 |
| 2,450,222 | Ashburn | Sept. 28, 1948 |
| 2,666,716 | Kadell | Jan. 19, 1954 |
| 2,815,327 | Mehr et al. | Dec. 3, 1957 |
| 2,884,338 | Jenison | Apr. 28, 1959 |
| 2,923,041 | Ryznar | Feb. 2, 1960 |
| 3,004,869 | Palumbo | Oct. 17, 1961 |